US00RE34119E

United States Patent [19]

Foreman et al.

[11] E Patent Number: Re. 34,119

[45] Reissued Date of Patent: Nov. 3, 1992

[54] METHOD OF HEAT TREATING METAL USING A WASHABLE SYNTHETIC QUENCHANT

[75] Inventors: Robert W. Foreman, Bloomfield Hills, Mich.; Anthony G. Meszaros, Windsor, Canada

[73] Assignee: Park Chemical Company, Detroit, Mich.

[21] Appl. No.: 302,306

[22] Filed: Jan. 23, 1989

Related U.S. Patent Documents

Reissue of:

[64] Patent No.: 4,738,731
Issued: Apr. 19, 1988
Appl. No.: 915,427
Filed: Oct. 6, 1986

U.S. Applications:

[63] Continuation-in-part of Ser. No. 819,204, Jan. 15, 1986, abandoned, which is a continuation-in-part of Ser. No. 766,598, Aug. 19, 1985, abandoned.

[51] Int. Cl.[5] ..... C21D 1/48

[52] U.S. Cl. ..... 148/638; 148/28; 148/29; 148/713

[58] Field of Search ..... 148/18, 28, 29, 20.6

[56] References Cited

U.S. PATENT DOCUMENTS

| | | | |
|---|---|---|---|
| 3,022,205 | 2/1962 | Chase et al. | 148/206 |
| 3,902,929 | 9/1975 | Meszaros | 148/28 |
| 4,087,290 | 5/1978 | Kopietz et al. | 148/18 |
| 4,826,545 | 5/1989 | Foreman et al. | 148/18 |

FOREIGN PATENT DOCUMENTS

| | | | |
|---|---|---|---|
| 2099858 | 12/1982 | United Kingdom | 148/28 |
| 2133047 | 7/1984 | United Kingdom | 148/28 |

*Primary Examiner*—John P. Sheehan
*Attorney, Agent, or Firm*—Krass & Young

[57] ABSTRACT

A method of quenching metal components utilizing a water based quenching composition which includes a polyvinylpyrrolidone polymer of high molecular weight and in relatively high concentrations and thereafter power washing the parts to remove the polymeric film. Another preferred embodiment uses the same high molecular weight polyvinylpyrrolidone in combination with two rust inhibiting agents which greatly extend the time during which the quenchant film left on the quenched parts remains water soluable, while still providing an excellent approximation of the cooling curve characteristic of an oil quenchant.

13 Claims, No Drawings

METHOD OF HEAT TREATING METAL USING A WASHABLE SYNTHETIC QUENCHANT

Matter enclosed in heavy brackets [ ] appears in the original patent but forms no part of this reissue specification; matter printed in italics indicates the additions made by reissue.

RELATED APPLICATION

This application is a continuation-in-part of Ser. No. 819,204 filed Jan. 15, 1986 now abandoned which is a continuation-in-part of Ser. No. 766,598 filed Aug. 19, 1985, now abandoned.

FIELD OF THE INVENTION

This invention relates to heat treating methods and particularly to a method of quenching heated metal parts i.e., parts fabricated from steel, alloy steel, aluminum and aluminum alloys, using an aqueous solution of a polyvinylpyrrolidone polymer having surprisingly improved washability in water.

BACKGROUND OF THE INVENTION

It has been known for years to use oil as a quench medium in the heat treating of fabricated metal products. Oil exhibits a particularly desirable cooling response; i.e., a response which is characterized by a relatively fast cooling rate in the high temperature range and a relatively slow cooling rate in the low temperature range. The fast cooling rate in the high range is necessary to avoid the knee of the time-temperature transformation curve and the slow rate in the lower temperature range is desirable to minimize internal stresses in the quenched parts.

Although oil exhibits this highly advantageous cooling response, the secondary characteristics of the material are undesirable. The combustibility of oil leads to frequency fires in heat treating plants, thus affecting worker safety and insurance rates. The polluting characteristics of oil are such as to require special and expensive disposal procedures.

Accordingly, a substantial market has developed for quenchants comprising water soluble polymers such as polyvinyl alcohol, polyglycols, polyvinylpyrrolidone and sodium polyacrylate, the most popular of these being the polyglycols and polyvinylpyrrolidone.

U.S. Pat. No. 3,902,929 "Water Based Quenching Composition Comprising Polyvinylpyrrolidone and Method of Quenching" granted Sep. 2, 1975 to Anthony G. Meszaros discloses the use of an aqueous solution of polyvinylpyrrolidone having an average molecular weight of between about 5,000 and about 400,000 and in concentrations of between about 2% and 10% polymer solids by weight as a quenching composition for metal parts. According to the patent, the preferred molecular weight range is about 50,000 to about 360,000 and further, best results are obtained with an average molecular weight between about 100,000 and 200,000.

The patent further states that suitable results are obtained using a concentration of polyvinylpyrrolidone of about 1 to 13% by weight of the quenching composition.

The patent further discloses the use of rust inhibiting agents and bacteriocidal agents in the bath, but only in very small amounts.

BRIEF SUMMARY OF THE INVENTION

We have found that the best approximation of the cooling curve characteristic of oil can be achieved using an aqueous solution of polymer such as polyvinylpyrrolidone having a molecular weight as reported by GAF Corporation in a Technical Data Sheet published in June, 1986 in the range of 900,000 to 300,000 and preferably in the range between about 1,270,000 and 2,240,000. One preferred embodiment of the invention, which uses high molecular weight polymeric quenchant at concentrations between about [10% and 25% product by volume] *1.75% to 5% by weight*, not only closely approximates the desired cooling curve characteristic of oil but also exhibits surprisingly increased removability from the quenched parts using a water bath or spray wash.

Another preferred embodiment combines the above-described aqueous solution of polymer such as polyvinylpyrrolidone with a substantially greater amount, in percentage by weight, of at least one and preferably two organic rust inhibitors, by way of example, AQUALOX 225 A-100, manufactured by the Alox Corporation of Niagara Falls, NY and triethanolamine (T.E.A.) manufactured by the Union Carbide Corporation of New York, NY. These greater amounts, in percentage by weight, of the two rust inhibitors in combination with a lesser percentage by weight of PVP, the balance being water, not only increase the rust-inhibiting characteristics of the quenchant but unexpectedly greatly extend the period of time during which the quenchant film on the quenched parts remains highly water soluable. It is unexpected that the approximation of the oil quenchant cooling curve characteristic is retained despite the presence of high concentrations of two rust inhibitors. Even more surprising is the extension of time during which the quenchant film retains its high water soluability; this aspect is yet unexplained.

One preferred embodiment exhibits advantageous high soluability in water immediately after quenching, i.e. while the quenchant film is still wet, but water soluability declines markedly when the quenchant film has dried. Conversely, the alternative embodiment combining PVP with both AQUALOX 225 A-100 and T.E.A., retains the high water soluability of the quenchant film up to two to three weeks after quenching, long after drying. This alternative embodiment thus extends the functional range of the polymer quenchant beyond metallurgical applications in which the material is quenched and essentially immediately thereafter washed, to applications in which the washing and subsequent surface treatment of the quenched material is delayed up to three weeks.

Accordingly, our invention may be summarized in one aspect as a method of quenching metal parts comprising the steps of heating the parts to a desired temperature above a metallurgical transformation range, quenching the parts in an aqueous solution of a polymer having a molecular weight in the range of between 900,000 and 3,000,000 and product concentrations of between about [10% and 25% by volume] *1.75% and 5% by weight*, removing the parts from the quenchant and thereafter washing the parts to remove the polymeric film. In another aspect, the invention is a quenching composition comprising an aqueous solution of a high molecular weight polymer such as polyvinylpyrrolidone in the range of 900,000 to , 3,000,000.

The advantage of the invention may be supplemented by incorporating with the invention a system for recovering the polymer from the power wash water and returning it either to the bath or to a storage facility for later use in reconstituting the bath.

DETAILED DESCRIPTION OF PREFERRED EMBODIMENTS

The preferred formulation for use as the quenching composition herein is as follows:

| | Range of amount % by weight |
|---|---|
| (1) water | 78.95–79 |
| (2) paraformaldehyde (bacteriocidal agent and perservative) | 0–0.05 |
| (3) rust inhibiting agent A | 0.80–7 |
| (4) rust inhibiting agent B | 0.20–7 |
| (5) polymer having an average molecular weight of about 1,270,000 to 2,240,000 at 25% solution by weight, GAF Corp. products K-90, K-110 | 7–20 |

To prepare the quench bath approximately ⅓ of item number 1 above is transferred into heated mixer apparatus and the temperature is brought to about 190° F. Items 2, 3 and 4 are then added and mixed until all of the solids are dissolved and a clear solution is obtained. Heating is then discontinued. The remainder of Item 1 is added and Item 5 is added and mixed until clear and uniform. This product is then placed in a rust proof container by drawing it through a 40 mesh screen.

The polymer used herein is preferably that specified in the specification of U.S. Pat. No. 3,902,929 and the disclosure of that patent is incorporated herein by reference. The polymer, however, should have a molecular weight within the range of about 900,000 to about 3,000,000 and preferably the average molecular weight should be about 1,270,000 and 2,240,000. The rust inhibiting agents and the bacteriocidal agent may be present in the amounts specified in U.S. Pat. No. 3,902,929 and, as stated in that patent, the quenching media may also optionally include as minor amounts at least one water soluble material selected from the group consisting of polyvinyl alcohol, polyoxyalkylene glycol polymer or a cellulosic polymer. Generally this minor amount should be less than 5% by weight of the composition.

One preferred formulation of the invention includes 0.5% by weight paraformaldehyde, a bacteriocide and preservative, 0.80% by weight rust inhibiting agent A, comprising Borax, and 0.20% by weight rust inhibiting agent B, comprising sodium nitrite. This embodiment also includes 20% by weight polymer as described above, the balance being water.

In another preferred formulation using the same [polymer] *of the 25% by weight polymer solution* described above, rust inhibiting agent A is AQUALOX 225A-100 as manufactured by the Alox Corporation and rust inhibiting agent B is triethanolamine (T.E.A.) as manufactured by the Union Carbide Corporation. The formulation of this alternative embodiment for use as the quenching composition comprises 7% by weight AQUALOX 225A-100, 7% by weight T.E.A., no bacteriocide, 7% by weight polymer, balance water.

AQUALOX 225A-100, is commercially available from the Alox Corporation of Niagara Falls, N.Y. It can be broadly described as an oxygenated hydrocarbon in which a portion of the free organic acid produced by oxidation is neutralized with amine and blended with a minor amount of amine. More specifically, it is an amine salt, a diethanolamine of aliphatic carboxylic acid in which the oxygenated hydrocarbon portion can be either aliphatic or aromatic. AQUALOX 225A-100 is characterized as a 100% active, low foaming, surface active agent which effectively inhibits the attack of ferrous metals by aqueous solution.

Triethanolamine (T.E.A.), also called Tri(2-hydroxyethyl)-amine, is a member of the alkanolamine family, having a formula of $(HOC_2H_4)_3N$. It also effectively inhibits the attack of ferrous metals by aqueous solutions. It is commercially available from the Union Carbide Corporation of New York, New York.

The process of the invention comprises heating the metal parts using conventional techniques to a temperature which is above the metallurgical transformation zone well known to those skilled in the art and thereafter submerging the parts in a quench bath constituted as previously described. In addition, the quench bath is preferably agitated so that the flow of quenchant past the parts is about 100 ft./min. The bath is operated at a temperature of about 120° F. to 160° F. The parts are thereafter removed from the quench bath and are subjected to a washing step, preferably using water spray at pressures of about 20 to 45 psi.

By way of example it has been found that an immersion wash removes only 35.14% on the polymer film on a panel quenched in a bath consisting of 10% by volume concentration of the polyvinylpyrrolidone based quenchant the average molecular weight of which was between 100,000 and 200,000, whereas immersion wash of a similar panel removed 68.83% of a 25% solution of 1,270,000 molecular weight polymer (K-90). Similarly, a power wash at 37 psi removes 73.11% of the K-60 polymer film formed by quenching in a 20% by volume concentration bath, whereas a 37 psi pressure water spray removes 96.30% of the polymeric film on panels quenched in a bath consisting of a 25% by volume concentration of polyvinylpyrrolidone based quenchant having an average molecular weight of about 1,270,000 (K-90).

The second example of the preferred embodiment, combining Alox 225 A-100 and T.E.A. with the polymer in aqueous solution, not only provides similar advantageous water soluability in both immersion wash and power wash, but also extends the time during which the quenchant film upon the material remains highly soluable, to a period of up to two to three weeks after quenching, well after the treated material has dried. This formulation also greatly enhances the rust inhibiting characteristic of the quenchant.

The wash water is preferably caught and processed such as by filtration or distillation to recover the polymer from the wash water. The polymer, after sufficient concentration of high molecular weights has been achieved, may be returned to a storage facility or directly to the bath to maintain the correct concentration of the bath in accordance with the disclosures of this document.

While it will be apparent that the preferred embodiment of the invention disclosed above is calculated to fulfill the objects above stated it will be appreciated that the invention is susceptible to modification, variation and change without departing from the spirit and scope of the following claims.

We claim:

1. A method of heat treating fabricated metal parts comprising the steps of:

(A) heating the parts to a temperature above a metallurgical transformation range;

(B) placing the parts in a heated, agitated quench bath comprising an aqueous solution of about [10%] *1.75%* to 25% by volume of polyvinylpyrrolidone having a molecular weight in the range of between [900,000 and 3,000,000] *1,270,000 and 2,240,000*;

(C) removing the parts from the quench bath; and (D) water washing the parts to substantially remove any polymeric film formed on the parts in the quench bath.

2. A method as defined in claim 1 wherein the concentration of the polyvinylpyrrolidone is approximately [25% by volume] *5% by weight.*

[3. A method as defined in claim 1 wherein the polyvinylpyrrolidone has a molecular weight in the range of between about 1,270,000 and 2,240,000.]

4. A method as defined in claim 1 further including the step of recovering the polyvinylpyrrolidone from the wash water.

5. A method as defined in claim 1 wherein the washing step is performed by a power spray at a pressure in the range of about 20 to 45 psi.

6. A method as defined in claim 1, wherein the bath temperature is about 130° F.

7. A method of heat treating fabricated metal parts comprising the steps of:

(A) heating the parts to a temperature above a metallurgical transformation temperature range;

(B) placing the parts in a heated, agitated quench bath consisting essentially, by weight, of:

(i) about [7%] *1.75% to 5%* of polyvinylpyrrolidone having a molecular weight in the range of between [900,000 and 3,000,000] *1,270,000 and 2,240,000*;

(ii) about 7% of an amine-neutralized, carboxylic acid;

(iii) about 7% of triethanolamine; and (iv) the balance water;

(C) removing the parts from the quench bath; and (D) water washing the parts to substantially remove any polymeric film formed on the parts in the quench bath.

[8. A method as defined in claim 7 wherein the polyvinylpyrrolidone has a molecular weight in the range of between about 1,270,000 and 2,240,000.]

9. A method as defined in claim 7 further including the step of recovering the polyvinylpyrrolidone, amine neutralized carboxylic acid and triethanolamine from the wash water.

10. A method of heating treating fabricated metal parts comprising the steps of:

(A) heating the parts to a temperature above a metallurgical transformation temperature range;

(B) placing the parts in a heated, agitated quench bath consisting essentially, by weight [,] of:

(i) about [20%] *1.75% to 5%* of polyvinylpyrrolidone having a molecular weight in the range between [900,000 and 3,000,000] *1,270,000 and 2,240,000*;

(ii) about 0.8% borax;

(iii) about 0.2% sodium nitrite; and (iv) the balance water;

(C) removing the parts from the quench bath; and (D) water washing the parts to substantially remove any polymeric film formed on the parts in the quench bath.

11. A method as defined in claim 10 wherein said quench bath also includes about 0.5%, by weight, of a bacteriocidal agent.

[12. A method as defined in claim 10 wherein the polyvinylpyrrolidone has a molecular weight in the range of between about 1,270,000 and 2,240,000.]

13. A method as defined in claim 10 further including the step of recovering the polyvinylpyrrolidone, borax and sodium nitrite from the wash water.

14. A method for controlling the microstructure of carbon steel objects by immersing said objects, after preheating in a water based polymeric bath wherein the improvement comprises constituting said bath as an aqueous solution comprising about [7-20%] *1.75% to 5%* by weight polyvinylpyrrolidone having a molecular weight between about [900,000 and 3,000,000] *1,270,000 and 2,240,000* and the balance water.

15. The method of claim 14 wherein the quenchant is constituted of said polyvinylpyrrolidone and water and, in addition, at least about 7% weight of each triethanolamine and an amine neutralized, carboxylic acid rust inhibitor.

16. The method of claim 15 including the later step of water washing the objects using a power spray at a pressure in the range of about 20 to 40 psi to remove residual polyvinylpyrrolidone from the objects.

* * * * *